(12) United States Patent
Sloane et al.

(10) Patent No.: US 10,664,498 B2
(45) Date of Patent: May 26, 2020

(54) INTERCONNECTED GRAPH STRUCTURED DATABASE FOR IDENTIFYING AND REMEDIATING CONFLICTS IN RESOURCE DEPLOYMENT

(71) Applicant: BANK OF AMERICA CORPORATION, Charlotte, NC (US)

(72) Inventors: Brandon Sloane, Santa Barbara, CA (US); Rachel Yun Kim Bierner, Los Angeles, CA (US); Mark Earl Brubaker, Simi Valley, CA (US); Regina Yee Cadavid, San Gabriel, CA (US); John Brian Costello, Long Beach, CA (US); John Howard Kling, Santa Barbara, CA (US); Cora Yan Quon, Los Angeles, CA (US); Tracie Buffington Wescott, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 259 days.

(21) Appl. No.: 15/958,515

(22) Filed: Apr. 20, 2018

(65) Prior Publication Data

US 2019/0325056 A1    Oct. 24, 2019

(51) Int. Cl.
| | |
|---|---|
| G06F 7/00 | (2006.01) |
| G06F 16/28 | (2019.01) |
| G06F 16/23 | (2019.01) |
| G06F 16/245 | (2019.01) |
| G06F 16/248 | (2019.01) |

(52) U.S. Cl.
CPC ........... *G06F 16/283* (2019.01); *G06F 16/23* (2019.01); *G06F 16/245* (2019.01); *G06F 16/248* (2019.01)

(58) Field of Classification Search
CPC .... G06F 16/283; G06F 16/245; G06F 16/248; G06F 16/23
USPC ......................................... 707/736, 741, 798
See application file for complete search history.

(56) References Cited

U.S. PATENT DOCUMENTS

| | | | |
|---|---|---|---|
| 7,020,617 | B2 | 3/2006 | Ouimet |
| 7,346,529 | B2 | 3/2008 | Flores |
| 7,467,095 | B2 | 12/2008 | Ouimet |
| 7,752,562 | B2 | 7/2010 | Mohanty et al. |
| 7,870,004 | B2 | 1/2011 | Kananghinis et al. |

(Continued)

*Primary Examiner* — Md I Uddin
(74) *Attorney, Agent, or Firm* — Michael A. Springs; Moore & Van Allen PLLC; Vaidehi Bachoti

(57) ABSTRACT

The invention provides an interconnected graph database system, method and computer program product structured for identifying and remediating conflicts in resource deployment. In some embodiments, the present invention is configured to identify a source node of a plurality of first nodes of a first graph database system. The source node is typically associated with a first information technology operational activity. In addition, the present invention is configured for determining a lateral relationship between the source node of the first graph database system and a target node of a plurality of second nodes of a second graph database system. Moreover, the present invention is configured for determining that the lateral relationship between the source node and the target node comprises a conflict, and in response, blocking initiation of the first information technology operational activity.

20 Claims, 4 Drawing Sheets

(56) References Cited

U.S. PATENT DOCUMENTS

| | | | |
|---|---|---|---|
| 8,272,061 B1* | 9/2012 | Lotem | G06F 21/577 |
| | | | 709/223 |
| 8,386,284 B2 | 2/2013 | Connors et al. | |
| 8,548,840 B2 | 10/2013 | Anthony et al. | |
| 8,712,812 B2 | 4/2014 | Snow et al. | |
| 9,202,182 B2 | 12/2015 | Joodi | |
| 9,529,989 B2 | 12/2016 | Kling et al. | |
| 9,536,070 B2 | 1/2017 | Kling et al. | |
| 9,558,334 B2 | 1/2017 | Kling et al. | |
| 9,792,322 B2 | 10/2017 | Merriman et al. | |
| 2002/0042731 A1 | 4/2002 | King, Jr. et al. | |
| 2003/0093310 A1 | 5/2003 | Macrae | |
| 2004/0172320 A1 | 9/2004 | Spellman et al. | |
| 2006/0143219 A1 | 6/2006 | Smith et al. | |
| 2007/0143175 A1 | 6/2007 | Tien et al. | |
| 2007/0265899 A1 | 11/2007 | Angier et al. | |
| 2008/0255912 A1 | 10/2008 | Christiansen et al. | |
| 2011/0072018 A1 | 3/2011 | Walls et al. | |
| 2012/0059687 A1 | 3/2012 | Keyte et al. | |
| 2012/0096043 A1* | 4/2012 | Stevens, Jr. | G06F 16/9024 |
| | | | 707/798 |
| 2012/0209886 A1* | 8/2012 | Henderson | G06F 16/273 |
| | | | 707/798 |
| 2014/0289402 A1 | 9/2014 | Moloian et al. | |
| 2015/0088614 A1 | 3/2015 | King | |
| 2015/0317384 A1* | 11/2015 | Rooney | G06F 3/04842 |
| | | | 707/741 |
| 2016/0117358 A1* | 4/2016 | Schmid | G06F 16/24 |
| | | | 707/736 |
| 2019/0317949 A1* | 10/2019 | Florissi | G06F 16/285 |

\* cited by examiner

INTERCONNECTED GRAPH STRUCTURED DATABASE FOR IDENTIFYING AND REMEDIATING CONFLICTS IN RESOURCE DEPLOYMENT

FIELD OF THE INVENTION

The present invention embraces a system, computer program product, and method for operatively connecting multiple multidimensional graph database systems for remediating conflicts in resource deployment.

BACKGROUND

Traditional relational (e.g. SQL) databases typically arrange data within tables and employ join algorithms to establish relationships between sets of data. As the data and relationships amongst the data become increasingly complex, the computational cost of querying relationships becomes highly burdensome for the computing systems which host the database. Furthermore, traditional graph databases only allow relationships or nodes to be defined to a single dimension, which limits the level of detail and granularity to which data can be precisely defined. Moreover, traditional graph database systems are not configured for interconnection between nodes of different systems, nor are they configured for identifying or mitigating deployment of conflicting resources. Accordingly, there is a need for an advanced systems that addresses the above technical problems in existing systems.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention provide a system, computer program product, and a computer-implemented method for an interconnected graph database structured for identifying and remediating conflicts in resource deployment. The technical system of the invention typically comprises a first graph database system having a plurality of first nodes associated with a first program/plan of an entity. The technical system further comprises a second graph database system having a plurality of second nodes associated with a second program/plan of the entity. The system further comprises a computer apparatus including at least one processor, at least one memory device with computer-readable program code stored thereon and a network communication device. The at least one processor is operatively coupled to the least one memory device and the network communication device such that the processing device is configured to execute the computer-readable program. In some embodiments, the invention is structured to identify initiation of a first information technology operational activity by a user device, wherein the first information technology operational activity is associated with deployment of a first technology resource; identify a source node of the plurality of first nodes of the first graph database system associated with the first information technology operational activity, wherein the source node comprises a property of the source node associated with the first information technology operational activity, wherein the first graph database system comprises a relationship between the source node and at least one first node of the plurality of first nodes; determine a relationship path associated with the source node based on analyzing at least one of the source node, the property of the source node and the relationship between the source node and at least one first node of the plurality of first nodes; determine a lateral relationship between the source node of the first graph database system and a target node of the plurality of second nodes of the second graph database system based on at least the relationship path, wherein the target node of the second graph database system is associated with a second information technology operational activity, wherein determining the lateral relationship comprises (i) determining that that the first information technology operational activity is a cause of the second information technology operational activity, (ii) determining that the first technology resource associated with the first information technology operational activity is influenced by the second information technology operational activity, and/or (iii) determining that the first technology resource associated with the first information technology operational activity and a second technology resource associated with the second information technology operational activity have a similar operation shift; determine that the lateral relationship between the source node of the first graph database system and the target node of the second graph database system comprises a conflict based on at least analyzing the lateral relationship; in response to determining that the lateral relationship between the source node of the first graph database system and the target node of the second graph database system comprises the conflict, block initiation of the first information technology operational activity; and initiate transmission of an alert to the user device, wherein the alert comprises a presentation of the determined lateral relationship comprising the conflict between the source node of the first graph database system and the target node of the second graph database system.

In some embodiments, or in combination with any of the previous embodiments, the invention is configured to identify a trigger technology element associated with the conflict associated with the source node of the first graph database system and the target node of the second graph database system in at least one of the (i) the source node, (ii) the property of the source node and (iii) the relationship between the source node and at least one first node of the plurality of first nodes; identify a remediation action for the trigger technology element required to remediate the conflict associated with the source node of the first graph database system and the target node of the second graph database system; modify, in real-time, the trigger technology element in at least one of the (i) the source node, (ii) the property of the source node and (iii) the relationship between the source node and at least one first node of the plurality of first nodes, based on the remediation action; and resume, initiation of the modified first information technology operational activity.

In some embodiments, or in combination with any of the previous embodiments, determining the lateral relationship between the source node of the first graph database system and the target node of the second graph database system further comprises: augmenting the source node with a first pointer associated with the lateral relationship such that the relationship path of the source node comprises the lateral relationship; and augmenting the target node with a second pointer associated with the lateral relationship such that a relationship path of the target node comprises the lateral relationship.

In some embodiments, or in combination with any of the previous embodiments, the invention is configured to identify that the lateral relationship between the source node of the first graph database system and the target node of the second graph database is obsolete; modify the source node to remove the first pointer associated with the lateral relationship; and modify the target node to remove the second pointer associated with the lateral relationship.

In some embodiments, or in combination with any of the previous embodiments, determining the lateral relationship between the source node of the first graph database system and the target node of the second graph database system further comprises: determining the lateral relationship between the property of the source node and at least one of (i) the target node, (ii) a property of the target node, and (iii) a relationship between the target node and at least one second node of the plurality of second nodes of the second graph database system.

In some embodiments, or in combination with any of the previous embodiments, determining the lateral relationship between the source node of the first graph database system and the target node of the second graph database system further comprises: determining the lateral relationship between the relationship between the source node and at least one first node of the plurality of first nodes, and at least one of (i) the target node, (ii) a property of the target node, and (iii) a relationship between the target node and at least one second node of the plurality of second nodes of the second graph database system.

In some embodiments, or in combination with any of the previous embodiments, the deployment of the first technology resource comprises a modification to the first technology resource.

In some embodiments, or in combination with any of the previous embodiments, the first technology resource comprises system hardware, technology devices, technology applications, operating systems, servers, networks, databases and/or technology processes.

In some embodiments, or in combination with any of the previous embodiments, determining the lateral relationship path associated with the source node further comprises: constructing a path query comprising the source node and a search parameter; translating the path query into a set of low level instructions; executing, via the second graph database system, the low level instructions to begin a search at the second graph database; and retrieving data from the second graph database according to the source node and the search parameter.

In some embodiments, or in combination with any of the previous embodiments, identifying the source node associated with the first information technology operational activity further comprises: determining that the first program associated with the first information technology operational activity; determining the first graph database associated with the first program; and analyzing the first graph database to identify the source node associated with the first information technology operational activity.

In some embodiments, or in combination with any of the previous embodiments, identifying the source node associated with the first information technology operational activity further comprises: determining at least one attribute associated with the first information technology operational activity; constructing a search query comprising the at least one attribute; translating the search query into a set of low level instructions; executing, via the first graph database system, the low level instructions to begin a search of the plurality of first nodes; and retrieving data from the first graph database according to the at least one attribute.

In some embodiments, or in combination with any of the previous embodiments, identifying the source node associated with the first information technology operational activity further comprises identifying (i) initiation of the construction of the source node or (ii) modification of the source node.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
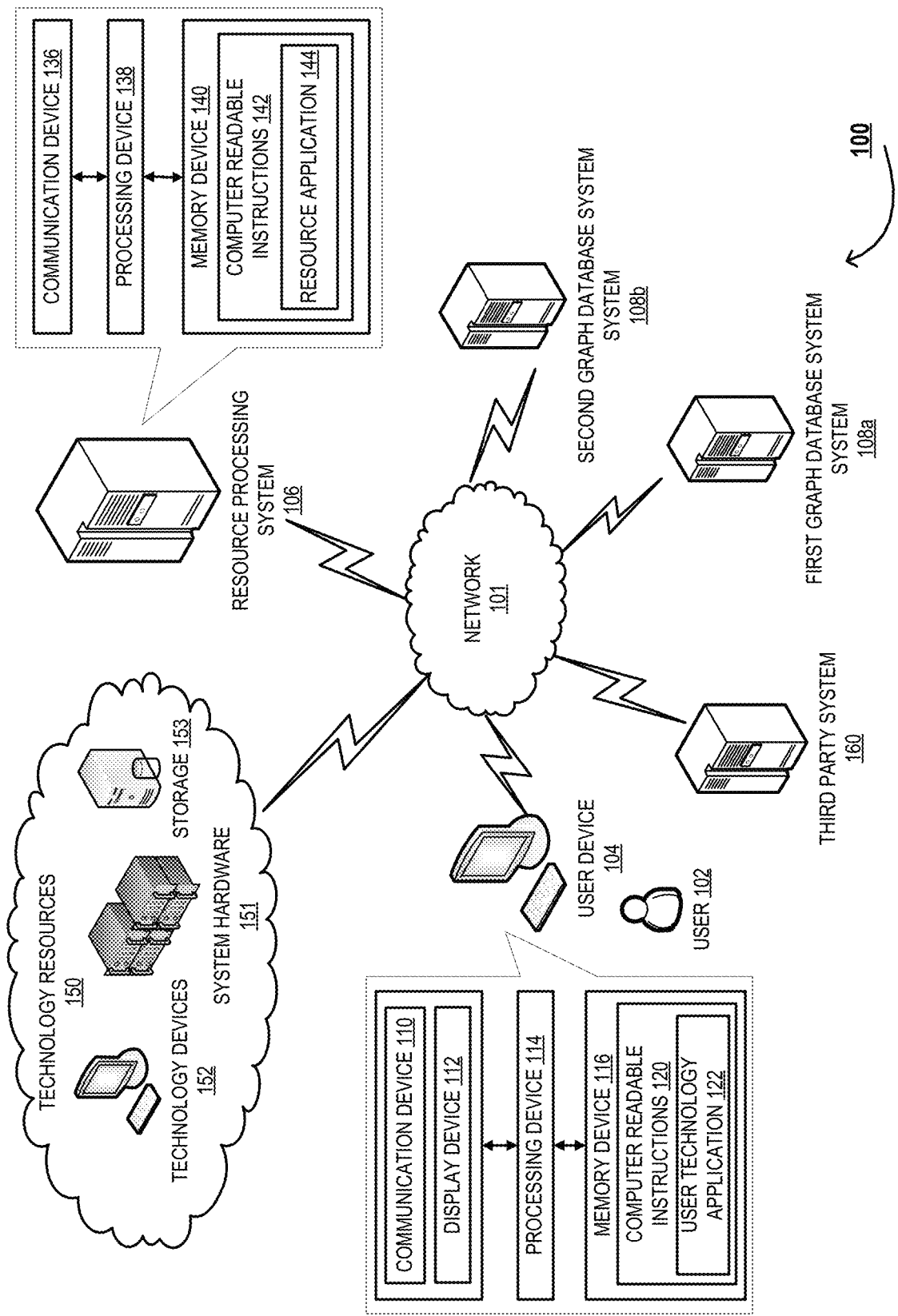
Figure 2:
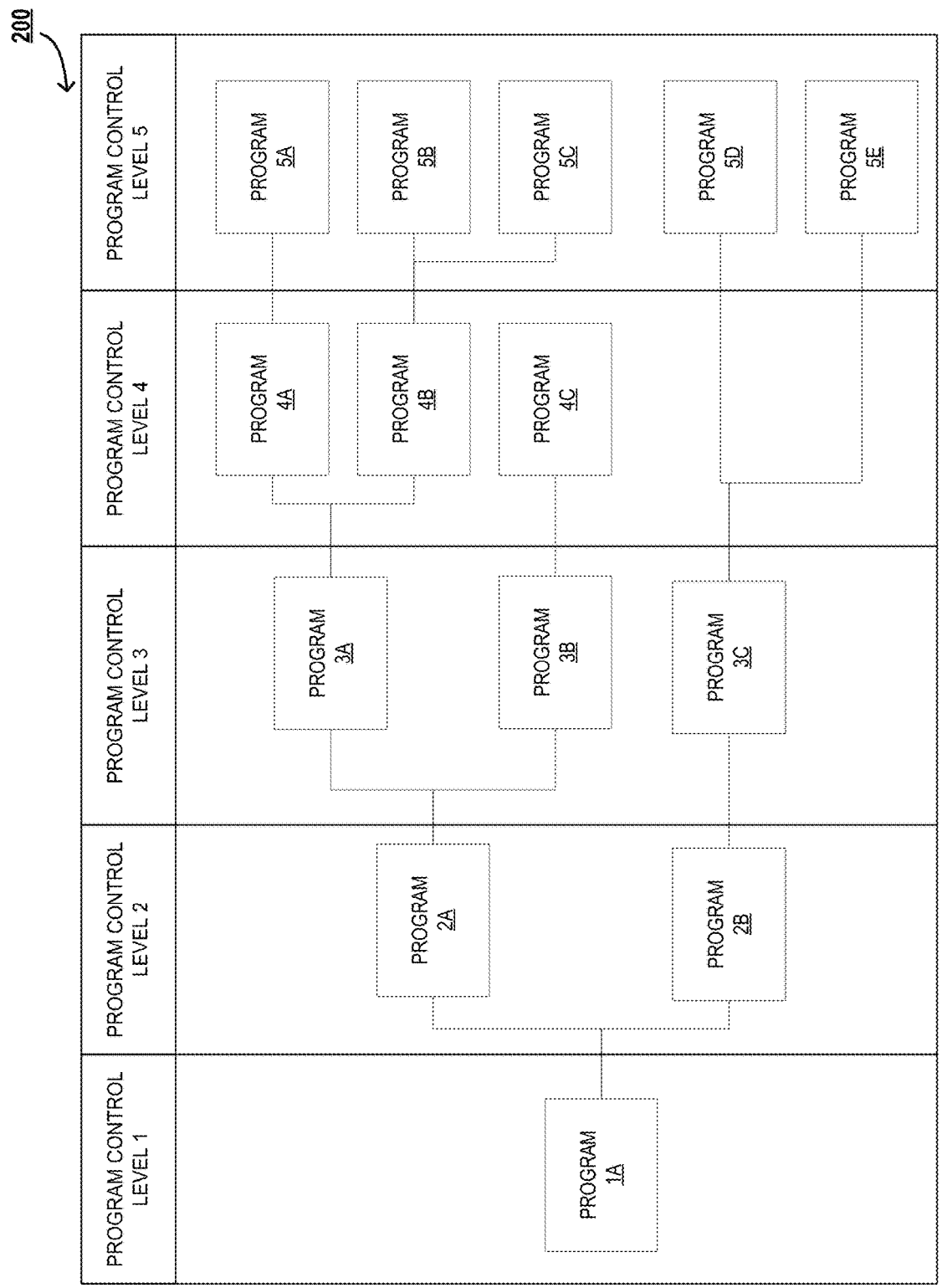
Figure 3:
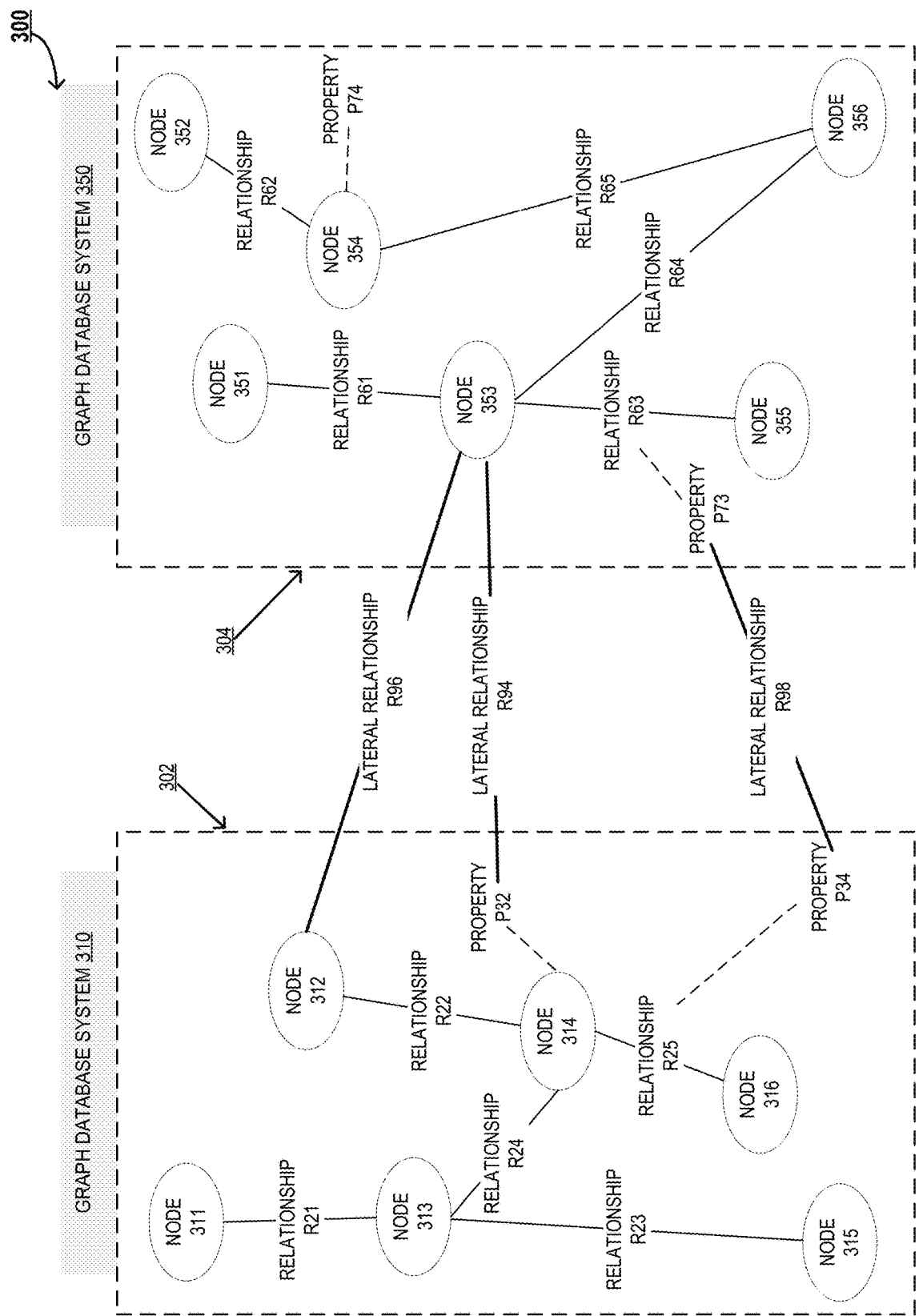
Figure 4:
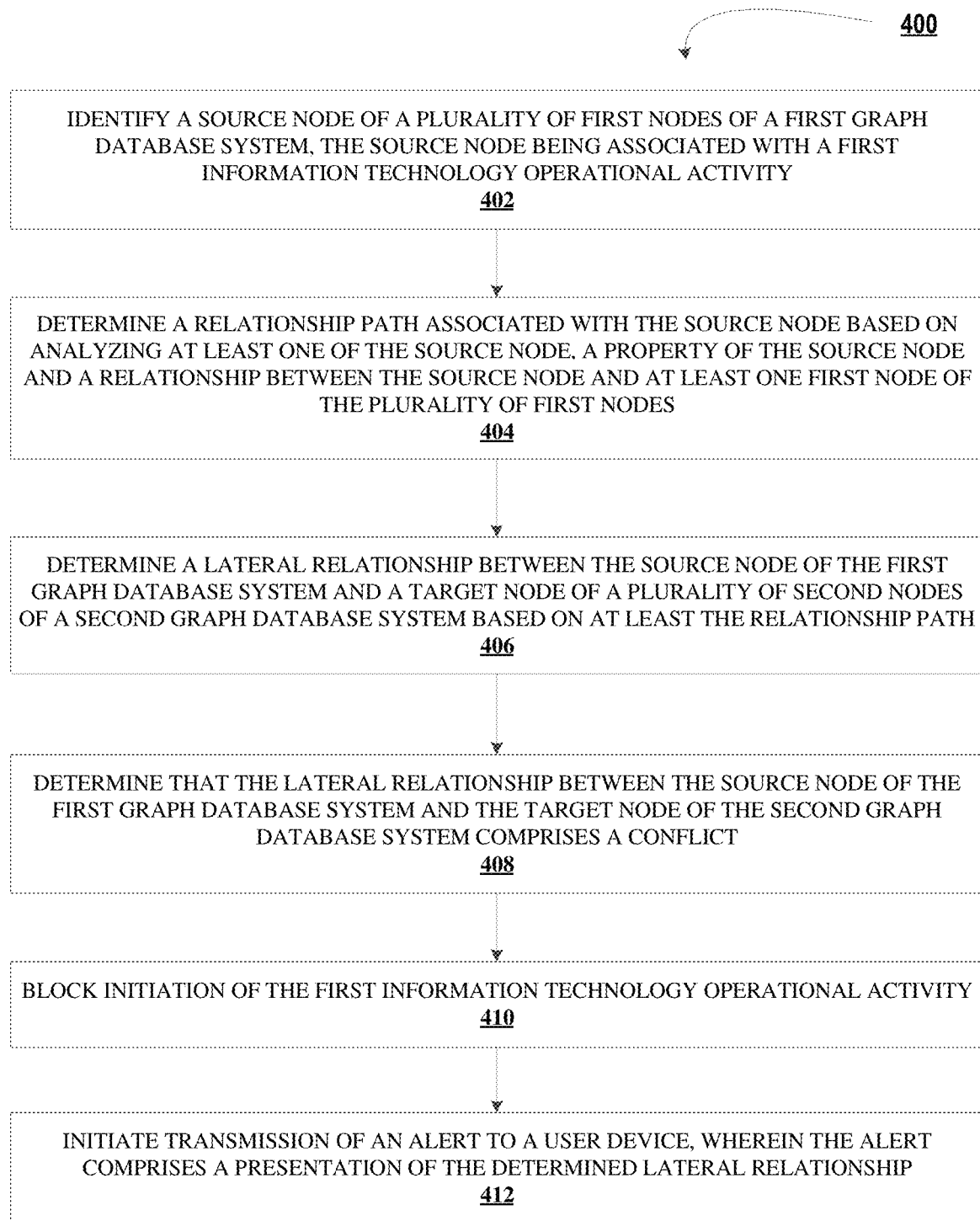

Having thus described embodiments of the invention in general terms, reference will now be made to the accompanying drawings, wherein:

FIG. 1 illustrates a graph database system environment 100, configured for identifying and remediating conflicts in resource deployment, in accordance with some embodiments of the present invention;

FIG. 2 illustrates a high level schematic representation 200 of program levels of an entity, in accordance with some embodiments of the present invention;

FIG. 3 illustrates a high level schematic representation 300 of an interconnected graph database system, in accordance with some embodiments of the present invention; and FIG. 4 illustrates a high level process flow for identifying and remediating conflicts in resource deployment via an interconnected graph database system, in accordance with some embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" or "enterprise" as used herein may be any institution employing information technology resources and particularly technology infrastructure configured for large scale processing of electronic files, electronic technology event data and records, and performing/processing associated technology activities. In some instances, the entity's technology systems involve performing a multitude of technology activities (e.g., information technology operational activities or resource deployment) across multiple distributed technology platforms and across numerous focus area levels, objective levels, objectives, resource targets and/or the like. Typically, these technology activities across multiple distributed technology platforms involve large scale processing of technology activity files and electronic records. As such, the entity may be any institution, group, association, financial institution, establishment, company, union, authority or the like, employing information technology resources. In some embodiments, "entity" may refer to an individual or an organization that owns and/or operates a system of networked computing devices and/or systems on which the graph database is implemented. The entity may be a business organization, a non-profit organization, a government organization, and the like. In other embodiments, the entity may be a single individual who wishes to log data and complex interactions amongst the data sets.

"Computing system", "computing device," "server" or "system" as used herein may refer to a networked computing device within the entity system environment or entity system infrastructure (e.g., a system structured for storing and/or operating on a graph database and/or a system for facilitating/performing/monitoring one or more technology change events or technology incidents, one or more technology resources, etc.). The computing system may include one or more of a processor, a non-transitory storage medium, a communications device, and a display. The computing system may support user logins and inputs from any combination of similar or disparate devices. Accordingly, the computing system may be a portable electronic device such as a smartphone, tablet, or laptop, or the computing system may be a stationary unit such as a personal desktop computer, networked terminal, or server. In some embodiments, the computing system may be a local or remote server which is configured to send and/or receive inputs from other computing systems on the network. Furthermore, as used herein the term "user device" or "mobile device" may refer to computing devices such as mobile phones, personal computing devices, tablet computers, wearable devices, and/or any portable electronic device capable of receiving and/or storing data therein.

Typically, an entity or enterprise is associated with a plurality of information technology operational activities. The "information technology operational activities," or "resource activities" or "resource deployment" as referred to herein, may comprise any activities, operations, transactions, technology change activities, technology incidents, actions and events associated with focus area levels, objective levels, objectives, resource targets and/or the like of an entity, associated with day-to day functioning of an entity, associated with operations and control activities of technology resources of the entity, associated with external networks of the entity, associated with activities performed/initiated by employees, affiliates or customers of the entity, and/or the like.

In some embodiments, the information technology operational activities may comprise operational activities associated with system hardware, operating systems, servers, technology applications, internal networks, storage/databases, user interfaces, authentication operations, middleware, software program products, external networks, software applications, hosting/facilities, business/technology processes, electrical infrastructure, and other technology resources or technology assets associated with the entity. In some embodiments, the information technology operational activities may be associated with transactional activities of the enterprise, comprising technology changes, technology events, technology maintenance activities, technology incidents, technology problems, technology releases, technology service requests, technology projects, configuration activities, technology resource/asset management activities, vendor transactions and the like. In some embodiments, the plurality of information technology operational activities may comprise technology change events/activities and technology incidents. As used herein, the term "event" relates to a discrete modification, addition, or deletion of a business asset, system, process, product, or the like. Exemplary events may include installing new hardware in an existing entity system, updating software used by the entity, implementing a procedural change to a business process, rolling out a new product or service, or updating the entity's website. As used herein, the term "change" relates to any program, project, or event related to the modification, addition, deletion of one or more business assets, systems, processes, products, or the like. The term "technology change" refers to any technology related change. The technology involved in a technology change may include computer hardware or software.

Technology change events typically comprise intended modifications to the structure or functioning of one or more technology resources, for example based on focus area levels, objective levels, objectives, resource targets and/or the like of one of the distributed technology platforms of the entity. Technology change events may comprise changing/modifying the operating system of a server, updating the versions of one or more security/authentication applications of a processor, performing hardware changes, addition of networking capabilities, hardware/software reconfiguration with/without restart, servicing, or otherwise modifying one or more aspects of the technology resources. Technology incidents or technology incident activities may comprise variation in functioning of technology resources (reduction in capacity, slowdown in processing speeds, and the like) notifications, alerts, errors, pause/stops in processes, and the like. In some embodiments, technology incidents may be caused or triggered by the implementation of technology change events. The technology incidents caused by technology changes may be referred to a technology change incidents.

"Graph database," "graph database system," or "graph structure database" as used herein, typically refers to a database that employs graph structures for semantic queries with nodes, edges and properties to represent and store data. Typically, the graph database comprises one or more relationships (or edges or graphs), which directly relate data items or nodes. The relationships allow data in the data items or nodes to be linked together directly, and retrieved with a single operation. Typically, the graph databases are distinct from relational databases which, if at all, are only configured to store links between data in a database in the database itself at the logical level, and typically do not allow easy modification of the logical structure. Moreover, conventional relational databases are typically not capable of maneuvering complex hierarchical structures within a database at all, much less across a plurality of databases across multiple distributed technology platforms of an entity. Moreover, conventional relational databases are not structured for providing relationships and their relationship properties between records, in other words, these conventional databases do not comprise a relationship level data abstraction.

"Node" or a "graph database node" as used herein may refer to a data structure which represents a technology operational activity of the plurality of activities, an entity, an individual, a technology resource, a technology change event, a technology incident, or the like. The nodes are typically structured to include a pointer to one or more nodes. In general, in some embodiments, each information technology operational activity of the plurality of activities, is associated with a "node" comprising properties/attributes, i.e., data/information regarding the activity. This node may be directed to describing, recording, identifying and/or documenting the activity. Although referred to as "a node", it is understood that, in some embodiments each information technology operational activity may be associated with multiple nodes. Here, each step associated with performing the information technology operational activity may be associated with a separate node.

"Relationship," "graph database relationship," "edge," or "graph" as used herein may refer to a data structure that links one node to another. Typically, the relationship has a source node and a target node, and is structured to indicate attributes of the relationship between the nodes (e.g., how the nodes are related, what properties of the nodes are integrated/connected, and/or the like). In some embodiments, a node may also have a relationship with itself.

"Property" or "attribute" or "technology element" as used herein may refer to a label containing germane information of associated nodes, relationships, and other properties. As such properties may be applied to nodes, relationships, and other properties. Properties may create groups of sets organized by common properties, in which nodes, relationships, and properties that have the same property belong to the same set. Each node, relationship, and property may have more than one property associated with it. In some embodiments, each node or relationship may be associated with one or more properties or technology elements comprising data associated with the information technology operational activity. In this regard, each of the one or more properties or technology elements may comprise data associated with one or more aspects of the information technology operational activity, comprising but not limited to, technology resources/infrastructure involved, activity target, time, location, applications involved, type of activity, person/system that initiated/performed the activity, and/or other aspects. Furthermore, the properties or technology elements may by discrete components of the graph database, or the properties or technology elements may merely refer to one or more portions of a single data component. For example, a property of a node or relationship may comprise a sentence or phrase describing an information technology operational activity. Here, the property may comprise multiple technology elements with each individual technology element referring to one or more words in the sentence/phrase. The nodes, relationships and properties may comprise descriptive data, textual data, unformatted data, formatted data, or any other available forms of data/information or a combination of forms. This data may be transformed, formatted, encoded, decoded, or otherwise fundamentally altered during storage, retrieval, data/language processing, and other operations.

As described herein, a "user" is an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a system performing one or more tasks described herein. "User" as used herein may refer to an individual who may utilize the graph database system. The user may be an agent, administrator, or employee of the entity who has authorization to add, modify, or delete data, or query existing data, nodes and/or relationships. In other embodiments, the user may be a client or customer of the entity. In yet other embodiments, the user may be unaffiliated with the entity who has some type of interaction with the entity's system. In the instances where the entity is a financial institution, a user may be an individual or entity with one or more relationships affiliations or accounts with the entity (for example, a financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "user resource" or "account" may be the relationship that the user has with the entity. Examples of user resources include a deposit account, such as a transactional account (e.g. a banking account), a savings account, an investment account, a money market account, a time deposit, a demand deposit, a pre-paid account, a credit account, or the like. The user resource is typically associated with and/or maintained by an entity.

As used herein, a "user interface" may be a graphical user interface. Typically, a graphical user interface (GUI) is a type of interface that allows users to interact with electronic devices such as graphical icons and visual indicators such as secondary notation, as opposed to using only text via the command line, such as those associated with the nodes, relationships and other elements of graphical databases. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, processing systems and the like.

FIG. 1 illustrates a graph database system environment 100, in accordance with one embodiment of the present invention, configured for identifying and remediating conflicts in resource deployment. As illustrated in FIG. 1, the resource processing system 106 is operatively coupled, via a network 101 to technology resources 150, the one or more graph database systems (108a, 108b), the user system/device 104, and to the third party system 160. In this way, the resource processing system 106 can send information to, and receive information from the technology resources 150, the one or more graph database systems (108a, 108b), the user system 104 and the third party system 160 to analyze and modify, in real-time, information technology operational activities and their interdependencies across a plurality of graph database systems (108a, 108b) of an entity. FIG. 1 illustrates only one example of an embodiment of the graph database system environment 100, and it will be appreciated that in other embodiments one or more of the systems, devices, or servers may be combined into a single system, device, or server, or be made up of multiple systems, devices, or servers.

In some embodiments, the data associated with the information technology operational activities and the graph databases, may be generated by, provided by, accessed by and/or operated upon by the resource processing system 106, by the one or more graph database systems (108a, 108b), by technology resources 150, the user device 104 and/or other external or third party systems 160. For example, the system 106 may establish operative communication channels with the technology resources 150, via the network 101. The system 106 may identify an information technology operational activity associated with a first resource and construct, or cause a graph database system (108a, 108b) to construct, a first node for the information technology operational activity, including one or more properties or technology elements comprising data identifying the first resource, time stamp of the activity and the like at the graph database system (108a, 108b). Continuing with the example, in some embodiments, the system 106 may further construct or cause the graph database system (108a, 108b) to construct, relationship(s) between the first node and one or more existing nodes.

In some embodiments, other systems such as the user device 104 may construct, or cause a graph database system (108a, 108b) to construct, a new node for an information technology operational activity, including one or more properties or technology elements comprising data identifying the activity at the graph database system (108a, 108b). The nodes, the properties and/or the data associated with the information technology operational activity may be provided by users 102 using the user device 104. As described previously, the user 102 may refer to employees, technical subject matter experts, operators and other personnel associated with the entity or affiliates of the entity. As an illustration, a user 102 may create a node identifying the server/system hardware 151 (resource) associated with an application update (information technology operational activity) initiated by the user 102. Here, in some embodiments, the system 106 is structured to analyze the new node sought to constructed by the user device 104, the information technology operational activity (application update) associated with the node, relationships with other existing nodes and/or the like and subsequently may perform one or more transformation actions such as preventing deployment of resources associated with the information technology operational activity, preventing the user device 104 from performing one or more activities/actions, allowing the information technology operational activity, allowing deployment of resources, modifying one or more of the information technology operational activity, the associated node or its properties, or the like.

The graph databases comprising the plurality of nodes, regarding the plurality of information technology activities are typically stored in the one or more graph database systems (108a, 108b). In some embodiments the records (information associated with the nodes, relationships, properties etc.) from the activity record database may be retrieved or accessed based on satisfying requisite authentication/authorization requirements. However, it is contemplated that some or all of the records may be stored in other memory locations/devices, for example, memory device 140, the user device 104, technology resources 150 and the like.

The graph database systems (108a, 108b) may further be configured to be ACID (Atomicity, Consistency, Isolation, Durability) compliant in order to ensure that database transactions are completed in a timely and stable manner. An ACID compliant database comprises atomicity (i.e. each database transaction is verified for integrity), consistency (i.e. each data entry is verified for consistency with database rules), isolation (i.e. each database transaction is able to be processed independently), and durability (i.e. data is resistant to failures).

In some embodiments, each of the graph database systems (108a, 108b) may comprise a database control system, which is configured to receive user-submitted queries and manage run time access to the database. The conversion of user-submitted queries may be achieved through a query processor, which may translate the queries and/or commands inputted by the user into low level instructions which may then be executed by the runtime database manager. In this way, the graph database systems (108a, 108b) are able to provide a layer of abstraction through which the user may use identifiable commands to execute the addition, deletion, modification, querying, and retrieval functions of the graph database. The database control system may further serve the function of maintaining the structure and fidelity of the data by the use of error checking and/or correction.

In some embodiments, each of the graph database systems (108a, 108b) may further comprise a database engine which controls, secures and provides access to the data. The database engine may be responsible for authorizing and/or authenticating users and restricting some functions of the graph database depending on the user class. For instance, an administrator of the entity's systems may be provided with the least restrictive rule set, which may allow the administrator to freely add, remove, edit, and query the data within the database. On the other hand, a client of the entity may be provided only with access to the query functions of the database, while a member of the public may be precluded from utilizing any of the functions of the graph database.

The graph database systems (108a, 108b) may further comprise a report generation utility which extracts information from the databases and presents it to the user in a number of different formats. The user 102 may be able to select specific records for viewing in a desired format, such as graphs, charts, tables, formatted text, and the like. For example, the user may be an administrator of the entity, and may wish to gather data on cyber-attacks carried out on the entity's systems for the purposes of strengthening its security countermeasures and/or prevention methods. If the user wishes to retrieve data on the most frequently encountered type of attack, the user may wish to sort the queried data through a table to allow for ease of calculations. On the other hand, if the user wishes to retrieve data on the geographic locations of the attacks, the user may wish to display the retrieved data on a chart such as a map. Alternatively, if the user wishes to retrieve data on the frequency of a particular type of attack over a certain period of time, the user may wish to display the retrieved data on a labeled graph. As the system allows for increasingly complex data and relationships, the report generation utility is also able to display the complex data in a way that is most relevant and comprehensible to the user.

The network 101 may be a global area network (GAN), such as the Internet, a wide area network (WAN), a local area network (LAN), near field communication network, audio/radio communication network, ultra-high frequency wireless communication network, or any other type of network or combination of networks. The network 101 may provide for wireline, wireless, or a combination wireline and wireless communication between devices on the network 101.

In some embodiments, the user 102 is an individual associated with the entity. In some embodiments, the user 102 may access the resource processing system 106 through an interface comprising a webpage or a user technology application 122. Hereinafter, "user technology application" is used to refer to an application on the user system 104 of a user, a widget, a webpage accessed through a browser, and the like. In some embodiments the user technology application 122 is a user system application stored on the user system 104. In some embodiments the user technology application may refer to a third party application or a user application stored on a cloud used to access the resource processing system through a network. In some embodiments, at least a portion of the user technology application 122 is stored on the memory device 140 of the resource processing system 106. The user 102 may subsequently navigate through the interface, retrieve one or more activity records, provide confirmation, or review presented information using a user system 104.

FIG. 1 also illustrates the user system 104. The user system 104 generally comprises a communication device 110, a display device 112, a processing device 114, and a memory device 116. The user system 104 is a computing system that allows a user 102 to interact with the resource processing system 106 to configure, monitor or control information technology operational activities of the entity. The processing device 114 is operatively coupled to the communication device 110, the display device 112, and the memory device 116. The processing device 114 uses the communication device 110 to communicate with the network 101 and other devices on the network 101, such as, but not limited to the third party system 160 and the resource processing system 106. As such, the communication device 110 generally comprises a modem, server, or other device for communicating with other systems/devices on the network 101. In some embodiments the network 101 comprises a network of distributed servers.

The user system 104 comprises computer-readable instructions 120 stored in the memory device 116/data storage, which in one embodiment includes the computer-readable instructions 120 of the user technology application 122. In this way, a user 102 may remotely communicate with the resource processing system 106, view retrieved data and visual displays, and/or modify the implementation of information technology operational activities using the user system 104 and the graph database systems (108a, 108b). The user system 104 may be, for example, a desktop personal computer, a mobile system, such as a cellular phone, smart phone, personal data assistant (PDA), laptop, or the like. Although only a single user system 104 is depicted in FIG. 1, the system environment 100 may contain numerous user systems 104.

As further illustrated in FIG. 1, the resource processing system 106 generally comprises a communication device 136, a processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs or one or more modules, based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the one or more graph database systems (108a, 108b), the third party system 160 and the user system 104. As such, the communication device 136 generally comprises a modem, server, or other device for communicating with other devices on the network 101.

As further illustrated in FIG. 1, the resource processing system 106 comprises computer-readable instructions 142 stored in the memory device 140, which in one embodiment includes the computer-readable instructions 142 of a resource application 144 configured for systematic data processing of a plurality of information technology operational activities.

As further illustrated by FIG. 1, the system environment 100 further comprises a one or more graph database systems (108a, 108b). The system environment 100 further comprises technology resources 150 comprising system hardware 151, technology devices and applications 152, operating systems, servers, technology applications, internal networks, storage/databases 153, user interfaces, authentication operations, middleware, program products, external networks, hosting/facilities, business/technology processes, and other technology resources or technology assets associated with the entity. In some embodiments, the resource processing system 106 communicates with the individual technology resources 150, via established operative communication channels. In this regard, the system 106 may transmit control instructions that cause the technology resources 150 to perform one or more actions, provide activity data, start/stop/modify deployment or actions associated with one or more resources 150 and the like. The technology resources 150 are typically configured to communicate with one another, other devices operated by the entity, and devices operated by third parties (e.g., customers), such as a third party computing device 160, via a network 101. Technology change activities performed on one technology resource may cause a technology conflict or incident/issue on the same technology resource or other technology resources, by the virtue of their interdependencies.

FIG. 2 illustrates a high level schematic representation 200 of program levels of an entity, in accordance with some embodiments of the invention. Typically, an entity or enterprise is associated with multiple distributed discrete technology platforms that work simultaneously to perform a myriad of processes associated with the entity. Each of these platforms are typically operate across various program control levels of the entity structure. Typically, the program control levels refer to hierarchical control levels of the entity such as program control level 1, program control level 2, program control level 3, program control level 4, and program control level 5. That said, an entity may comprise more or fewer program control levels. Each of the program control levels may be associated with one or more of technology sectors, geographical regions, operating divisions or sub-divisions, product divisions, entity functions and/or the like associated with the entity.

Typically, the program control level 1 refers to an overarching control level, at the highest level of abstraction, associated with implementing and monitoring universal control and performance parameters of the entity using one or more programs, such as program 1A or plan 1A. For instance, program 1A or plan 1A may be associated with formulating and/or implementing enterprise wide strategy/goals.

The program control level 2 may refer to a lower control level under the enterprise control level 1, with lower abstraction, associated with implementing and monitoring control and performance parameters of divisions of the enterprise using one or more programs for achieving the enterprise wide strategy/goals of program 1A. For instance, program/plan 2A and program/plan 2B may be associated with formulating and/or implementing divisional level strategy/goals for achieving the enterprise wide strategy/goals of program 1A.

Similarly, the program control level 3 may refer to a lower control level under the divisional control level 2, with lower abstraction, associated with implementing and monitoring control and performance parameters of sub-divisions of the enterprise using one or more programs/plans for achieving the divisional level strategy/goals of programs 2A and 2B. For instance, program/plan 3A and program/plan 3B may be associated with formulating and/or implementing sub-divisional level strategy/goals for achieving the divisional level strategy/goals of program 2A and program/plan 3C may be associated with formulating and/or implementing sub-divisional level strategy/goals for achieving the divisional level strategy/goals of program 2B.

Moreover, the program control level 4 may refer to a lower control level under the sub-divisional control level 3, with lower abstraction, associated with implementing and monitoring control and performance parameters of functions of the enterprise using one or more programs/plans for achieving the sub-divisional level strategy/goals of programs 3A and 3B. For instance, program/plan 4A-4C may be associated with formulating and/or implementing functional level strategy/goals for achieving the sub-divisional level strategy/goals of programs 3A-3B.

Similarly, the program control level 5 may refer to a lower control level under the functional control level 4, with lower abstraction, associated with implementing and monitoring control and performance parameters of operations of the enterprise using one or more programs/plans for achieving the functional level strategy/goals of programs 4A-4C and the sub-divisional level strategy/goals of program 3C. For instance, program/plans 5A-5C may be associated with formulating and/or implementing operational level strategy/goals for achieving the functional level strategy/goals of programs 4A-4C and program/plans 5D-5E may be associated with formulating and/or implementing operational level strategy/goals for achieving the sub-divisional level strategy/goals of program 3C.

Typically, each of these programs/plans operate upon the multiple distributed discrete technology platforms and the technology resources 150 for implementing the requisite goal/strategy. In some embodiments, each of the programs/plans comprise one or more information technology operational activities (interrelated and/or discrete activities) which are implemented/performed in a predetermined order, e.g., sequentially and/or in parallel, for implementing the associated goal/strategy of the program/plan. In the embodiments described herein, the programs/plans are constructed in the form of graph databases (e.g., those stored in graph database systems (108a, 108b)) such that each information technology operational activity of the program is constructed as one or more nodes of the graph database. Moreover, the various programs/plans and/or information technology operational activities (e.g., nodes when the programs are constructed in a graph database) of the programs may be created by, stored on, operated by and modified by different discrete systems within the entity infrastructure (e.g., the resource processing system 106, technology resources 150, graph database systems (108a, 108b), user device 104, third party system 160, etc.).

However, the various programs/plans and their information technology operational activities are typically interdependent and interconnected with respect to their operations of the distributed discrete technology platforms and the technology resources 150, and the various programs/plans across the control levels are typically implemented in parallel to perform a myriad of processes and steps associated with the goals/strategies. As an illustrative example, implementation of a first information technology operational activity of program 5D at the operational level, stored at a first database system 108a, may require a modification to a particular technology resource 151 (e.g., a technology change event such as modification to an operating system of the technology resource), which may be imitated by a first user/system 104. However, a second information technology operational activity of another program 3A at the sub-divisional level, stored at a second database system 108b, may utilize the same technology resource 151 and require the technology resource 151 to be in its pre-modified state. The modification of the technology resource 151 may result in a technology incident for implementation of the program 3A, i.e., the modification to the technology resource 151 adversely affects program 3A or the modification is in conflict with the implementation of the second information technology operational activity of program 3A or the program itself.

Conventional systems are not capable of identifying the interrelationships between the myriad of information technology operational activities of the programs/plans across the variously program control levels, stored in various database systems, in real time at all, much less identifying conflicts between them. Moreover, even within a single program/plan, it is only possible to identify relationships/interdependencies between various information technology operational activities, if at all, by parsing and analyzing data associated with each of the thousands or tens of thousands of information technology operational activities of the various programs/plans of the entity (or analyzing each node of the all of the programs/plans, all of its property's and all of its relationships in the event that the program/plan is implemented in a graph database) every time a resource deployment occurs (e.g., modification to an existing information technology operational activity, initiation of a new information technology operational activity, removal of an information technology operational activity, etc.). This process is time intensive and consumes high processing and memory resources that could be otherwise utilized for other operations. Moreover, because the analysis requires intensive time durations, it is typically not possible to identify the interdependencies of the information technology operational activities prior to the implementation of the resource deployment which may result in conflicts may derail multiple programs/plans across various program control levels. Continuing with the previous illustrative example, conventional systems may not be able to identify that implementation of the first information technology operational activity of program 5D is interrelated with the second information technology operational activity of program 3A before the resource deployment occurs (the modification to the technology resource 151), which would result in the technology incident for implementation of the program 3A, i.e., a conflict, which prevents the completion of the program 3A.

The present invention provides an advanced system that addresses the above technical problems in existing systems and allows for real-time high volume data processing using graph structured databases and allows for identifying and remediating conflicts and resource deployment. The interconnected graph database environment of the present invention provides a number of significant enhancements to computing technology in comparison to traditional databases. Firstly, the present invention is structured for defining relationship paths comprising multiple dimensions of properties and relationships across various graph databases of different programs/plans to store data and define properties and relationships to a level of detail and granularity that is not technologically possible with currently existing databases. In particular, the present invention is also structured to modify the data structures and the associated query language to allow each node, relationship, and property to be further defined by one or more properties and/or relationships. For example, a node of a first graph database may have a property that is defined by another property, which may in turn have relationships to nodes, relationships, and other properties of another graph database. In this way, the database schema may be extended in multiple dimensions to the extent necessary to accurately capture the data to be tracked across the various program/plans and their interrelationships across the various program control levels. In other words, additional layers of properties and relationships can be defined in relationship to existing nodes, properties and relationships to increase the fidelity of the information stored in the database. The query language may also be expanded to account for the added potential complexity of the database.

Secondly, arranging nodes, relationships, and properties in this manner allows the system to reduce the time that it takes to retrieve complex data and relationships in response to identification of resource deployment, thereby allowing for real-time identification of interrelationships and conflicts. The system of the present invention is both highly scalable and efficient. Thirdly, the present invention improves the functioning of the computing systems on which the databases are deployed by reducing the computing resources such as processing power, memory space, storage space, cache space, electric power, and networking bandwidth required to run the database and execute search queries.

FIG. 3 illustrates a high level schematic representation 300 of an interconnected graph database system, in accordance with some embodiments of the invention. Specifically, FIG. 3 depicts a line and symbol diagram representation of some of the data structures that may exist within the multidimensional graph databases, in accordance with some embodiments of the present invention. "Graph database," "graph database system," or "graph structure database" as used herein, typically refers to a database that employs graph structures for semantic queries with nodes, edges and properties to represent and store data. Typically, the graph database comprises one or more relationships (or edges or graphs), which directly relate data items or nodes. The relationships allow data in the data items or nodes to be linked together directly, and retrieved with a single operation.

As discussed previously, typically, the programs/plans of the entity operate upon the multiple distributed discrete technology platforms and the technology resources 150 for implementing associated goals/strategies. Each of the programs/plans comprise one or more information technology operational activities (interrelated and/or discrete activities) which are implemented/performed in a predetermined order, e.g., sequentially and/or in parallel, for implementing the associated goal/strategy of the program/plan. In the embodiments described herein, the programs/plans are constructed in the form of graph databases (e.g., those stored in graph database systems (108a, 108b)) such that each information technology operational activity of the program is constructed as one or more nodes of the graph database. Moreover, the various programs/plans and/or information technology operational activities (e.g., nodes when the programs are constructed in a graph database) of the programs may be created by, stored on, operated by and modified by different discrete systems within the entity infrastructure (e.g., the resource processing system 106, technology resources 150, graph database systems (108a, 108b), user device 104, third party system 160, etc.).

Specifically, FIG. 3 illustrates data structures of a portion of a first graph database 302, in accordance with some embodiments. This graph database 302 may be stored at a first graph database system 310 (e.g., similar to the first graph database system 108a) and is typically associated with a first program/plan for implementing an associated goal/strategy (e.g., at least one of programs 1A-5E described previously). FIG. 3 further illustrates data structures of a portion of a second graph database 304, in accordance with some embodiments. This graph database 304 may be stored at a second graph database system 350 (e.g., similar to the second graph database system 108b) and is typically associated with a second program/plan for implementing an associated goal/strategy (e.g., at least one of programs 1A-5E described previously).

"Node" or a "graph database node" as used herein may refer to a data structure which represents a technology operational activity of the plurality of activities, an entity, an individual, a technology resource, a technology change event, a technology incident, or the like. Specifically, the first graph database 302 may be associated with a plurality of nodes (311, 312, 313, 314, 315, 316, etc.), and the second graph database 304 may be associated with a plurality of nodes (351, 352, 353, 354, 355, 356, etc.). Moreover, each of the graph databases (302, 304) comprise one or more information technology operational activities which are constructed as one or more of the plurality of nodes. That said, one or more of the plurality of nodes may also represent a technology resource, a technology change event, a technology incident, an entity, a user/individual, or the like.

The plurality of nodes may be connected to one another via one or more relationships. Relationship," "graph database relationship," "edge," or "graph" as used herein may refer to a data structure that links one node to another. In some embodiments, the relationships are implemented by constructing pointers between nodes, relationships and/or properties. Typically, the relationship has a source node and a target node, and is structured to indicate attributes of the relationship between the nodes (e.g., how the nodes are related, what properties of the nodes are integrated/connected, and/or the like). In some embodiments, a node may also have a relationship with itself. Relationships are represented using solid lines in FIG. 3. For example, the first graph database 302 may comprise a relationship R21 between the nodes 311 and 313, a relationship R22 between the nodes 312 and 314, a relationship R23 between the nodes 313 and 315, a relationship R24 between the nodes 313 and 314 and a relationship R25 between the nodes 314 and 316. Similarly, the second graph database 304 may comprise a relationship R61 between the nodes 351 and 353, a relationship R62 between the nodes 352 and 354, a relationship R63 between the nodes 353 and 355, a relationship R64 between the nodes 353 and 356 and a relationship R65 between the nodes 354 and 356.

"Property" or "attribute" or "technology element" as used herein may refer to a label containing germane information of associated nodes, relationships, and other properties. As such properties may be applied to nodes, relationships, and other properties. Each node, relationship, and property may have more than one property associated with it. Properties are represented using dashed lines in FIG. 3. As illustrated, the nodes may comprise one or more properties. For example, node 314 of graph database 302 comprises a property P32 and node 354 of graph database 304 comprises a property P74. In some embodiments, the relationships themselves may be associated with one or more properties. For example, the relationship R25 between the nodes 314 and 316 of the graph database 302 may be associated with a property P34 and the relationship R63 between the nodes 353 and 355 of the graph database 304 may be associated with a property P73. In some embodiments, the properties within the graph database may in turn be associated with one or more other properties. For instance, property P32 of node 314 of graph database 302 may be associated with another property P36 (not illustrated). Typically, the system is configured to construct the various nodes (311-316 and 351-356), the associated properties and associated relationships. In this way, the database is more capable of expressing complex interactions between the nodes, relationships, and properties in multiple dimensions.

In some embodiments, the graph databases (302, 304) are constructed by the system (e.g., resource processing system 106). In some embodiments, the system may allow for a variety of different methods through which data may be entered into the graph database. In some embodiments, the user 102 may directly input the data into the graph database and is given the authorization to create nodes, relationships, and properties within the graph databases (302, 304). In other embodiments, data may be acquired via a data feed from third party servers 160. Typically, the system is structured to analyze unstructured data from the data feed, interpret it, and transform it into a structured data set to fit into the structure of the graph database. In other embodiments, the data within the graph database may be generated via machine learning. In such embodiments, data may be generated using existing programs/plans, such as by crawling the programs/plans to identify connections to be made between the various nodes and properties. The data may alternatively be generated using internal sources. For instance, the system may identify existing mappings created using nodes, relationships, and properties within the graph database and suggest additional mappings to the user.

The system is configured to determine, for each node of the plurality of nodes, a relationship path by evaluating interdependencies between the nodes, properties and relationships. Typically a relationship path comprises one or more relationship elements in a predetermined order indicating (i) the interdependencies between consecutive pairs of the one or more relationship elements and (ii) an overarching relationship between terminating relationship elements of the one or more relationship elements of the relationship path. The one or more relationship elements comprise one or more nodes, one or more properties and/or one or more relationships. For example, for the node 314 of the first graph database 302, the system may analyze the various relationships of the node 314 to determine the relationships R22, R24 and R25. The system may further analyze the relationship R24 to identify the associated node 313 and further identify that node 313 is interrelated with the node 314. In response, the system may further analyze the node 313 to identify the associated relationship R23 with node 315. In response to determining that node 315 is interrelated with node 314, the system may determine a first relationship path "node 314-relationship R24-node 313-relationship R23-node 315" for the node 314, such that the (i) consecutive pairs of the one or more relationship elements (node 314, relationship R24, node 313, relationship R23, node 315) are interdependent and (ii) terminating relationship elements node 314 and node 315 are inter dependent to establish an overarching relationship. As another example, similarly, for the node 353 of the second graph database 304, the system may analyze the relationship R64 of the node 353 to identify the associated node 356 and further identify that node 356 is interrelated with the node 354 via the relationship R65. In response, the system may further analyze the node 3354 to identify the associated relationship R623 with node 352. In response to determining that node 353 is not interrelated with node 352, the system may determine a relationship path "node 353-relationship R64-node 356-relationship R65-node 354-property P74" for the node 353, such that the (i) consecutive pairs of the one or more relationship elements (node 353, relationship R64, node 356, relationship R65, node 354, property P74) are interdependent and (ii) terminating relationship elements node 353 and property are inter dependent.

The a pair of relationship elements being "related," "interrelated," "interdependent" or comprising a relationship as used herein refers to (i) a first relationship element (or its associated information technology operational activity) being a cause of the second relationship element (or its associated information technology operational activity) of the pair of relationship elements, (ii) at least one technology resource associated with the first relationship element being influenced by the second relationship element (or its associated information technology operational activity) of the pair of relationship elements, and/or (iii) at least one technology resource associated with the first relationship element and at least one technology resource associated with the second relationship element of the pair having a similar operation shift, Operation shift as used herein may refer to predetermined, identified or measured changes/alterations to the functioning of the technology resources involved or to the resources themselves, as will be described in detail below.

In some embodiments, the system stores the determined relationship paths of a node (or another relationship element) by augmenting the data associated with the node (or another relationship element). In some embodiments, the system stores the determined relationship paths of a node (or another relationship element) at a relationship path storage location of the associated graph database. In some embodiments, the system determines the relationship paths for a node (or another relationship element), in real time, of its construction. In some embodiments, for a new node (or another relationship element) being created, the system identifies a relationship between the new node and an existing node, and determines a relationship path for the new node by augmenting an existing relationship path of the existing node with the new node.

The present invention is further structured to determine a lateral relationship between a node of the first graph database system and another node of the plurality of second nodes of the second graph database system, based on at least the relationship paths of the nodes. For example, for the node 314 (source node) of the first graph database 302, the system may determine (or retrieve previously determined) relationship paths "node 314-relationship R22-node 312", "node 314-property P32" and "node 314-relationship R25-property P34," based on identifying overarching inter dependencies of the paths and identifying interdependencies between consecutive pairs of relationship elements, as described above. Next, the system may construct a path query based on the relationship paths. The path query typically comprises data associated with the source node 314 and one or more search parameters. In some embodiments, the search parameters comprise one or more attributes/ features that are common to the relationship elements of one or more of the relationship paths associated with the source node 314. In some embodiments, the search parameters comprise one or more attributes/features that associated with the relationship elements of one or more of the relationship paths of the source node 314. In some embodiments, the one or more search parameters comprise the technology resources associated with the relationship elements of one or more of the relationship paths of the source node 314. The system may then translate the path query into a set of low level instructions and transmit control signals to the second graph database system 350 to cause a runtime database manager of the second graph database system 350 to execute the set of low level instructions on the second graph database 304 to begin a search. The system may then retrieve the data from the search of the second graph database system 350 and analyze the data to determine the lateral relationships between nodes of the two graph database systems (310, 350).

In some embodiments, the system may identify a lateral relationship between the source node 314 and the target node 353 based on at least determining that (i) a first information technology operational activity associated with the source node 314 is a cause of a second information technology operational activity associated with the target node 353. For instance, based on analyzing the data retrieved from the second graph database system 350 and the relationship path "node 314-property P32" of the source node 314, the system may determine that the source node 314 of the first graph database system 310 comprises lateral relationship with a target node 353 of the second graph database system 350. As illustrated, the system may identify a lateral relationship R94 between the source node 314 and the target node 353 based on at least determining that (i) a first information technology operational activity (indicated by property P32) associated with the source node 314 is a cause of a second information technology operational activity associated with the target node 353. For example, the first information technology operational activity associated with the source node 314 may be associated with a technology change operation (from example, changing/modifying the operating system of a server, updating the versions of one or more security/authentication applications of the server, performing hardware changes, addition of networking capabilities, hardware/software reconfiguration with/without restart, servicing, or otherwise modifying one or more aspects of the server from one state to another) performed on a first technology resource (for example, the server). The second information technology operational activity associated with the target node 353 maybe associated with an integrity check operation that is triggered by the technology change operation, either directly or indirectly. As another example, the system may determine a relationship between the first and a second activity of the one or more activities, based on identifying that the target technology resource of the first activity/technology change and the technology resource causing the second activity/incident are the same. Alternatively, or in addition with the previous instance, the system may determine that the first activity/technology change is directed to a project for improving a certain business/ technology process. The system may then identify second information technology operational activity that is caused by the technology change based on determining that the second information technology operational activity is directed to a program/plan that performs the specified business/technology process.

In some embodiments, the system may identify a lateral relationship between the source node 314 and the target node 353 based on at least determining that (ii) a first technology resource associated with a first information technology operational activity of the source node 314 is influenced by or influences a second information technology operational activity associated with the target node 353. For instance, based on analyzing the data retrieved from the second graph database system 350 and the relationship path "node 314-relationship R22-node 312" of the source node 314, the system may determine that the source node 314 of the first graph database system 310 comprises lateral relationship with a target node 353 of the second graph database system 350. As illustrated, the system may identify a lateral relationship R96 between the source node 314 and the target node 353 based on at least determining that (ii) a first technology resource (indicated by node 312) associated with a first information technology operational activity of the source node 314 is influenced by or influences a second information technology operational activity associated with the target node 353. For example, the first information technology operational activity associated with the source node 314 may be associated with a technology change operation (from example, changing/modifying the operating system of a server, updating the versions of one or more security/authentication applications of the server, performing hardware changes, addition of networking capabilities, hardware/software reconfiguration with/without restart, servicing, or otherwise modifying one or more aspects of the server from one state to another) performed on a first technology resource indicated by node 312 (for example, the server). The second information technology operational activity associated with the target node 353 maybe a technology application interface that runs on the resource 312 (e.g., the server) that would be affected by the change operation. As another example, the first activity may be directed to an event comprising one or more alerts/notifications associated with a technology resource comprising a specific technology application (indicated by node 312). The system may identify second activities with business/technology processes that were active during the duration of the alerts and infer that the implementation/functioning of the business/technology processes impacted the specific technology application.

In some embodiments, the system may identify a lateral relationship between the source node 314 and the target node 353 based on at least determining that (iii) a first technology resource associated with the first information technology operational activity of the source node 314 and a second technology resource associated with the second information technology operational activity of the target node 353 have a similar operation shift. For instance, based on analyzing the data retrieved from the second graph database system 350 and the relationship path "node 314-relationship R25-property P34" of the source node 314, the system may determine that the source node 314 of the first graph database system 310 comprises lateral relationship with a target node 353 of the second graph database system 350. As illustrated, the system may identify a lateral relationship R98 between the source node 314 and the target node 353 based on at least determining that (ii) a first technology resource (indicated by property P34) associated with the first information technology operational activity of the source node 314 and a second technology resource (indicated by property P73) associated with the second information technology operational activity of the target node 353 have a similar operation shift. Operation shift as used herein may refer to predetermined, identified or measured changes/alterations to the functioning of the technology resources involved or to the resources themselves. For example, the system may identify a first information technology operational activity of the source node 314 comprising an incident involving a first type of problem (for example, a specific type of improper functioning of a first technology application, a first error value reported by a resource, reduction in processing speed of a first resource and the like). The system may then identify a second information technology operational activity of the target node 353, wherein the second activity may be directed to same or similar problems as the first problem (for example, same type of functioning as the first technology application, a second error value within a predetermined range of the first value reported by a similar resource, similar reduction in processing speed of a second resource and the like). Here, the system may determine the relationship of recurring defects between the first and second information technology operational activities, based on determining that first and second activities report similar problems/similar operation that occur periodically, and further infer that these activities are likely caused by same or similar activities. Similarly, the first and second activities may be related to a certain type of operation shift comprising a specific improvement. The system may identify a relationship between these activities based on inferring that the improvements are caused by same or similar restoral actions.

FIG. 4 illustrates a high level process flow for identifying and remediating conflicts in resource deployment via an interconnected graph database system, in accordance with some embodiments of the present invention. Typically, the system is configured to identify initiation of a first information technology operational activity by a user device. As discussed, the first information technology operational activity is typically associated with deployment of a first technology resource. As discussed, the first technology resource may comprise system hardware, technology devices, technology applications, operating systems, servers, networks, databases and/or technology processes. In some embodiments, the deployment of the first technology resource comprises one or more of a modification to the first technology resource, initiation of a new first technology resource, modification of features/functions of the first technology resource, or the like.

As illustrated by block 402, the system is structured to identify a source node of the plurality of first nodes of the first graph database system associated with the first information technology operational activity. As discussed previously, the source node typically comprises a property of the source node associated with the first information technology operational activity. Moreover, the first graph database system typically comprises a relationship between the source node and at least one first node of the plurality of first nodes.

In some embodiments, to identify the source node, the system may first identify that a first program/plan (of a plurality of programs/plans associated with the entity) associated with the first information technology operational activity. The system may then determine a first graph database is associated with implementing the first program/plan. Subsequently, the system may then analyzing the first graph database to identify the source node associated with the first information technology operational activity.

In some embodiments, the user may initiate the resource deployment, i.e., the first information technology operational activity by creating a particular node at the first graph database system or modifying an existing node of the first graph database system. Here, the system may correlate (i) initiation of the construction of the particular node or (ii) modification of the particular node with the first information technology operational activity and determine that the new/modified node is the source node.

In some embodiments, to identify the source node, the system may determine at least one attribute (feature, function, associated technology resource, time period, geographical location, IP address, etc.) associated with the first information technology operational activity. The system may then construct a search query comprising the at least one attribute and subsequently translate the search query into a set of low level instructions. The system may then cause the first graph database system to execute the low level instructions to begin a search of the plurality of first nodes and their properties and relationships to identify a match with the least one attribute. The system may then retrieve data from search of the first graph database and analyze the data to determine the search query.

Next at block 404, the system is configured to determine a relationship path associated with the source node based on analyzing at least one of the source node, the property of the source node and the relationship between the source node and at least one first node of the plurality of first nodes. The determination of relationship paths is described in detail above with respect to FIG. 3.

Next, at block 406 the system is configured to determine a lateral relationship between the source node of the first graph database system and a target node of the plurality of second nodes of the second graph database system based on at least the relationship path. As previously discussed in detail with respect to FIG. 3, determining the lateral relationship comprises (i) determining that that the first information technology operational activity is a cause of a second information technology operational activity of the target node, (ii) determining that the first technology resource associated with the first information technology operational activity is influenced by the second information technology operational activity, and/or (iii) determining that the first technology resource associated with the first information technology operational activity and a second technology resource associated with the second information technology operational activity have a similar operation shift.

The determination of the lateral relationship is typically similar to the manner described in detail with respect to FIG. 3. As discussed, in some embodiments, the lateral relationship may be between a property of the source node and at least one of (i) the target node, (ii) a property of the target node, and (iii) a relationship between the target node and at least one second node of the plurality of second nodes of the second graph database system. Similarly, in some embodiments, the lateral relationship may be between the relationship between the source node and at least one first node of the plurality of first nodes, and at least one of (i) the target node, (ii) a property of the target node, and (iii) a relationship between the target node and at least one second node of the plurality of second nodes of the second graph database system.

In some embodiments, in response to determining the lateral relationship, the system may dynamically augment the source node with a first pointer associated with the lateral relationship such that the relationship path of the source node comprises the lateral relationship. Moreover, the system may also augment the target node with a second pointer associated with the lateral relationship such that a relationship path of the target node comprises the lateral relationship. In this manner, for future operations/information technology operational activities, the system may slimily analyze the pointer(s) associated with the lateral relationship to identify conflicts, without requiring repeated analysis.

Moreover, the system may dynamically and periodically re-analyze the determined relationships to ascertain their current validity. For instance, the system may identify that the lateral relationship between the source node of the first graph database system and the target node of the second graph database is obsolete. The system may then modify the source node to remove the first pointer associated with the lateral relationship and modify the target node to remove the second pointer associated with the lateral relationship, to remove the lateral relationship pointers.

As illustrated by block 408, the system is configured to determine whether the lateral relationship between the source node of the first graph database system and the target node of the second graph database system comprises a conflict. The system typically determines this based on at least analyzing the lateral relationship. Typically the conflict indicates that the deployment of the first technology resource for the first information technology operational activity would prevent, hinder or otherwise adversely affect the second information technology operational activity of the target node.

As illustrated by block 410, in response to determining that the lateral relationship between the source node of the first graph database system and the target node of the second graph database system comprises the conflict, the system is configured to block initiation of the first information technology operational activity, in real-time. In this regard, the system may transmit control instructions to the technology resource (e.g., technology resource 150) to cause the resource to stop operations related to the first information technology operational activity of the source node.

Next at block 412, the system may initiate transmission of an alert to the user device. The alert typically comprises a presentation of the determined lateral relationship comprising the conflict between the source node of the first graph database system and the target node of the second graph database system. The alert may comprise audio, visual and/or vibratory notifications. In some embodiments, transmitting the alerts may further comprise causing the user device to perform one or more functions. In this regard, the system may lock the display of at least a portion of a screen of the display device 112, move/rearrange portions of existing displays on the screen to accommodate the relationship information, change brightness of the screen of the display device 112, until the user 102 performs one or more predetermined actions/responses. Typically, the alert is transmitted via the network 101, via a local area network, near field communication, via the internet or any other suitable medium. For example, based on determining that the user device is offline or in a suspended state, the system may transmit text alerts/encoded signals that cause the user device to connect to a suitable network/turn on so that the relationship information may be conveyed to the user 102. In some embodiments, the system may perform the blocking action of block 410 only after receiving a confirmation from the user, following the display of the alert.

In some embodiments, the system is further configured to implement remediation actions for mitigating the identified conflict. Here, the system may identify a trigger technology element associated with the conflict of the source node of the first graph database system and the target node of the second graph database system. Typically the system analyzes at least one of the (i) the source node, (ii) the property of the source node and (iii) the relationship between the source node and at least one first node of the plurality of first nodes to identify the trigger technology element. For example, the system may identify a trigger technology element such as time duration of the determined conflict, particular features/functions of technology resources associated with the conflict, associated operators/individuals, and/or the like. The system may then identify a remediation action for the trigger technology element required to remediate the conflict associated with the source node of the first graph database system and the target node of the second graph database system. For example, the remediation action may comprise rescheduling one or both of the first information technology operational activity and the second information technology operational activity, performing the first and/or second information technology operational activity on other available technology resources that are similar to those identified to be in conflict, etc. The system may then modify, in real-time, the trigger technology element in at least one of the (i) the source node, (ii) the property of the source node and (iii) the relationship between the source node and at least one first node of the plurality of first nodes, based on the remediation action. Subsequently, the system may resume initiation of the modified first information technology operational activity.

In some embodiments, the present invention provides a framework for developing, monitoring, analyzing and modifying the plurality of programs/plans for an entity (such as the plurality of programs 1A-5E described with respect to FIG. 2 across a plurality of program control levels) for implementing various strategy/goals, via the graph database system environment illustrated in FIG. 1. The functions and features provided by framework provided by the invention are 3-fold, in some embodiments. Firstly, the present invention provides an advanced system that allows for real-time high volume data processing using graph structured databases and is configured for establishing complex relationship paths across graph databases for various programs/plans across various program control levels, as described previously. In other words, the present invention provides a unique, technical mechanism for not only interconnecting disparate graph databases but also for defining and tracking the established relationship paths and lateral relationships and their cumulative effect on strategic objectives of an entity, which would not be possible otherwise.

Secondly, in some embodiments, the system constructs a library of programs/plans. Specifically, for each program, the system constructs imperative(s), objective(s), execution path(s) and target structure(s), e.g., via nodes of a graph database for the program. Next, the system constructs nodes for actions and changes associated with the program which are then mapped onto delivery mechanisms such as current/future projects of the entity. The system then constructs program structures or templates for each program/plan by stripping data elements (e.g., initialized variables, properties, specifics regarding technology resources involved, etc.) that are particular to the program from the constructed program/plan, while retraining the relationships (e.g., relationship paths) and constructs of the program/plan. These program structures are then categorized based on various parameters such as goal type, program control level type, technology resources involved, and the like and subsequently stored in a library database. These program structures may then be retrieved based on the categorizations and utilized to construct new programs/plans by augmenting the program structure with particulars of the new program/plan. In this manner, the identified relationship paths and interconnections of existing programs/plans are retained and extrapolated for new programs/plans, thereby precluding the need for repeated analyses and expenditure of operating, time and memory resources.

Thirdly, by constructing and utilizing the program structures in a library of programs/plans, the present invention facilitates a standardized planning framework ontology across the entity, which provides holistic approach to program/plan construction and implementation.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for an interconnected graph database configured for identifying and remediating conflicts in resource deployment, the system comprising:
a first graph database system, wherein the first graph database system comprises a plurality of first nodes associated with a first program;
a second graph database system, wherein the second graph database system comprises a plurality of second nodes associated with a second program;
a computer apparatus including at least one processor, at least one memory device with computer-readable program code stored thereon and a network communication device; and
the at least one processor being operatively coupled to the least one memory device and the network communication device, wherein the at least one processor is configured to execute the computer-readable program code to:
identify initiation of a first information technology operational activity by a user device, wherein the first information technology operational activity is associated with deployment of a first technology resource;
identify a source node of the plurality of first nodes of the first graph database system associated with the first information technology operational activity, wherein the source node comprises a property of the source node associated with the first information technology operational activity, wherein the first graph database system comprises a relationship between the source node and at least one first node of the plurality of first nodes;
determine a relationship path associated with the source node based on analyzing at least one of the source node, the property of the source node and the relationship between the source node and at least one first node of the plurality of first nodes;
determine a lateral relationship between the source node of the first graph database system and a target node of the plurality of second nodes of the second graph database system based on at least the relationship path, wherein the target node of the second graph database system is associated with a second information technology operational activity, wherein determining the lateral relationship comprises (i) determining that that the first information technology operational activity is a cause of the second information technology operational activity, (ii) determining that the first technology resource associated with the first information technology operational activity is influenced by the second information technology operational activity, and/or (iii) determining that the first technology resource associated with the first information technology operational activity and a second technology resource associated with the second information technology operational activity have a similar operation shift;
determine that the lateral relationship between the source node of the first graph database system and the target node of the second graph database system comprises a conflict based on at least analyzing the lateral relationship;
in response to determining that the lateral relationship between the source node of the first graph database system and the target node of the second graph database system comprises the conflict, block initiation of the first information technology operational activity; and
initiate transmission of an alert to the user device, wherein the alert comprises a presentation of the determined lateral relationship comprising the conflict between the source node of the first graph database system and the target node of the second graph database system.

2. The system of claim 1, wherein the processing device is further configured to execute the computer-readable program code to:
identify a trigger technology element associated with the conflict associated with the source node of the first graph database system and the target node of the second graph database system in at least one of the (i) the source node, (ii) the property of the source node and (iii) the relationship between the source node and at least one first node of the plurality of first nodes;
identify a remediation action for the trigger technology element required to remediate the conflict associated with the source node of the first graph database system and the target node of the second graph database system;
modify, in real-time, the trigger technology element in at least one of the (i) the source node, (ii) the property of the source node and (iii) the relationship between the source node and at least one first node of the plurality of first nodes, based on the remediation action; and
resume, initiation of the modified first information technology operational activity.

3. The system of claim 1, wherein determining the lateral relationship between the source node of the first graph database system and the target node of the second graph database system further comprises:
augmenting the source node with a first pointer associated with the lateral relationship such that the relationship path of the source node comprises the lateral relationship; and
augmenting the target node with a second pointer associated with the lateral relationship such that a relationship path of the target node comprises the lateral relationship.

4. The system of claim 3, wherein the at least one processor is further configured to execute the computer-readable program code to:
identify that the lateral relationship between the source node of the first graph database system and the target node of the second graph database is obsolete;
modify the source node to remove the first pointer associated with the lateral relationship; and
modify the target node to remove the second pointer associated with the lateral relationship.

5. The system of claim 1, wherein determining the lateral relationship between the source node of the first graph database system and the target node of the second graph database system further comprises:
determining the lateral relationship between the property of the source node and at least one of (i) the target node, (ii) a property of the target node, and (iii) a relationship between the target node and at least one second node of the plurality of second nodes of the second graph database system.

6. The system of claim 1, wherein determining the lateral relationship between the source node of the first graph database system and the target node of the second graph database system further comprises:
    determining the lateral relationship between the relationship between the source node and at least one first node of the plurality of first nodes, and at least one of (i) the target node, (ii) a property of the target node, and (iii) a relationship between the target node and at least one second node of the plurality of second nodes of the second graph database system.

7. The system of claim 1, wherein the deployment of the first technology resource comprises a modification to the first technology resource.

8. The system of claim 1, wherein the first technology resource comprises system hardware, technology devices, technology applications, operating systems, servers, networks, databases and/or technology processes.

9. The system of claim 1, wherein determining the lateral relationship path associated with the source node further comprises:
    constructing a path query comprising the source node and a search parameter;
    translating the path query into a set of low level instructions;
    executing, via the second graph database system, the low level instructions to begin a search at the second graph database; and
    retrieving data from the second graph database according to the source node and the search parameter.

10. The system of claim 1, wherein identifying the source node associated with the first information technology operational activity further comprises:
    determining that the first program associated with the first information technology operational activity;
    determining the first graph database associated with the first program; and
    analyzing the first graph database to identify the source node associated with the first information technology operational activity.

11. The system of claim 1, wherein identifying the source node associated with the first information technology operational activity further comprises:
    determining at least one attribute associated with the first information technology operational activity;
    constructing a search query comprising the at least one attribute;
    translating the search query into a set of low level instructions;
    executing, via the first graph database system, the low level instructions to begin a search of the plurality of first nodes; and
    retrieving data from the first graph database according to the at least one attribute.

12. The system of claim 1, wherein identifying the source node associated with the first information technology operational activity further comprises identifying (i) initiation of construction of the source node or (ii) modification of the source node.

13. A computer program product for an interconnected graph database configured for identifying and remediating conflicts in resource deployment, the computer program product comprising a non-transitory computer-readable storage medium having computer-executable instructions to:
    identify initiation of a first information technology operational activity by a user device, wherein the first information technology operational activity is associated with deployment of a first technology resource;
    identify a source node of a plurality of first nodes of a first graph database system associated with the first information technology operational activity, wherein the source node comprises a property of the source node associated with the first information technology operational activity, wherein the first graph database system comprises a relationship between the source node and at least one first node of the plurality of first nodes;
    determine a relationship path associated with the source node based on analyzing at least one of the source node, the property of the source node and the relationship between the source node and at least one first node of the plurality of first nodes;
    determine a lateral relationship between the source node of the first graph database system and a target node of a plurality of second nodes of a second graph database system based on at least the relationship path, wherein the target node of the second graph database system is associated with a second information technology operational activity, wherein determining the lateral relationship comprises (i) determining that that the first information technology operational activity is a cause of the second information technology operational activity, (ii) determining that the first technology resource associated with the first information technology operational activity is influenced by the second information technology operational activity, and/or (iii) determining that the first technology resource associated with the first information technology operational activity and a second technology resource associated with the second information technology operational activity have a similar operation shift;
    determine that the lateral relationship between the source node of the first graph database system and the target node of the second graph database system comprises a conflict based on at least analyzing the lateral relationship;
    in response to determining that the lateral relationship between the source node of the first graph database system and the target node of the second graph database system comprises the conflict, block initiation of the first information technology operational activity; and
    initiate transmission of an alert to the user device, wherein the alert comprises a presentation of the determined lateral relationship comprising the conflict between the source node of the first graph database system and the target node of the second graph database system.

14. The computer program product of claim 13, wherein the non-transitory computer-readable storage medium further has computer-executable instructions to:
    identify a trigger technology element associated with the conflict associated with the source node of the first graph database system and the target node of the second graph database system in at least one of the (i) the source node, (ii) the property of the source node and (iii) the relationship between the source node and at least one first node of the plurality of first nodes;
    identify a remediation action for the trigger technology element required to remediate the conflict associated with the source node of the first graph database system and the target node of the second graph database system;
    modify, in real-time, the trigger technology element in at least one of the (i) the source node, (ii) the property of the source node and (iii) the relationship between the source node and at least one first node of the plurality of first nodes, based on the remediation action; and resume, initiation of the modified first information technology operational activity.

15. The computer program product of claim 13, wherein determining the lateral relationship between the source node of the first graph database system and the target node of the second graph database system further comprises:

determining the lateral relationship between the property of the source node and at least one of (i) the target node, (ii) a property of the target node, and (iii) a relationship between the target node and at least one second node of the plurality of second nodes of the second graph database system.

16. The computer program product of claim 13, wherein determining the lateral relationship between the source node of the first graph database system and the target node of the second graph database system further comprises:

determining the lateral relationship between the relationship between the source node and at least one first node of the plurality of first nodes, and at least one of (i) the target node, (ii) a property of the target node, and (iii) a relationship between the target node and at least one second node of the plurality of second nodes of the second graph database system.

17. A computerized method for an interconnected graph database configured for identifying and remediating conflicts in resource deployment, the computerized method comprising:

identifying initiation of a first information technology operational activity by a user device, wherein the first information technology operational activity is associated with deployment of a first technology resource;

identifying a source node of a plurality of first nodes of a first graph database system associated with the first information technology operational activity, wherein the source node comprises a property of the source node associated with the first information technology operational activity, wherein the first graph database system comprises a relationship between the source node and at least one first node of the plurality of first nodes;

determining a relationship path associated with the source node based on analyzing at least one of the source node, the property of the source node and the relationship between the source node and at least one first node of the plurality of first nodes;

determining a lateral relationship between the source node of the first graph database system and a target node of a plurality of second nodes of a second graph database system based on at least the relationship path, wherein the target node of the second graph database system is associated with a second information technology operational activity, wherein determining the lateral relationship comprises (i) determining that that the first information technology operational activity is a cause of the second information technology operational activity, (ii) determining that the first technology resource associated with the first information technology operational activity is influenced by the second information technology operational activity, and/or (iii) determining that the first technology resource associated with the first information technology operational activity and a second technology resource associated with the second information technology operational activity have a similar operation shift;

determining that the lateral relationship between the source node of the first graph database system and the target node of the second graph database system comprises a conflict based on at least analyzing the lateral relationship;

in response to determining that the lateral relationship between the source node of the first graph database system and the target node of the second graph database system comprises the conflict, blocking initiation of the first information technology operational activity; and initiating transmission of an alert to the user device, wherein the alert comprises a presentation of the determined lateral relationship comprising the conflict between the source node of the first graph database system and the target node of the second graph database system.

18. The computerized method of claim 17, wherein the computerized method further comprises:

identifying a trigger technology element associated with the conflict associated with the source node of the first graph database system and the target node of the second graph database system in at least one of the (i) the source node, (ii) the property of the source node and (iii) the relationship between the source node and at least one first node of the plurality of first nodes;

identifying a remediation action for the trigger technology element required to remediate the conflict associated with the source node of the first graph database system and the target node of the second graph database system;

modifying, in real-time, the trigger technology element in at least one of the (i) the source node, (ii) the property of the source node and (iii) the relationship between the source node and at least one first node of the plurality of first nodes, based on the remediation action; and resuming, initiation of the modified first information technology operational activity.

19. The computerized method of claim 17, wherein determining the lateral relationship between the source node of the first graph database system and the target node of the second graph database system further comprises:

determining the lateral relationship between the property of the source node and at least one of (i) the target node, (ii) a property of the target node, and (iii) a relationship between the target node and at least one second node of the plurality of second nodes of the second graph database system.

20. The computerized method of claim 17, wherein determining the lateral relationship between the source node of the first graph database system and the target node of the second graph database system further comprises:

determining the lateral relationship between the relationship between the source node and at least one first node of the plurality of first nodes, and at least one of (i) the target node, (ii) a property of the target node, and (iii) a relationship between the target node and at least one second node of the plurality of second nodes of the second graph database system.

* * * * *